United States Patent [19]

McLendon

[11] Patent Number: 4,900,293

[45] Date of Patent: Feb. 13, 1990

[54] 4:3 PERF CONVERSION SPROCKET

[76] Inventor: Donald C. McLendon, 502 Jackson Hill, Houston, Tex. 77007

[21] Appl. No.: 358,550

[22] Filed: May 26, 1989

[51] Int. Cl.[4] .................. F16H 55/02; G03C 3/02
[52] U.S. Cl. ...................................... 474/152; 352/241
[58] Field of Search ............. 474/164, 152, 158, 160; 352/44, 232, 233, 239, 241

[56] References Cited

U.S. PATENT DOCUMENTS

| 1,229,275 | 6/1917 | Jenkins | 352/241 |
| 3,865,738 | 2/1975 | Lente | 352/241 X |

FOREIGN PATENT DOCUMENTS 0360329  4/1906  France ................. 352/241

OTHER PUBLICATIONS

"Three-perforation at Clairmont," *American Cinematographer*, Dec. 1988.
"Trilent 35 System," *Image Technology*, Jul. 1988.
"Kodak's Coleman on HDTV and the Future of Film", *International Photographer*, Oct. 1988, pp. 16-19.

Primary Examiner—Thuy M. Bui
Attorney, Agent, or Firm—William E. Shull

[57] ABSTRACT

A sprocket assembly which allows a film projector or any other film handling device to be readily converted to run film which is either 4-perf or 3-perf. The sprocket assembly includes an outer cylindrical sleeve having teeth for engaging the film perforations when the film is run, and an inner cylindrical sleeve adapted to fit within and antirotationally mate with the outer cylindrical sleeve. The inner sleeve also has teeth for engaging the film perforations. The inner sleeve is mounted on a rotatable shaft of the projector, and the outer sleeve can be added or removed depending on whether the operator wishes to run 3-perf or 4-perf film. The outer and inner sleeves are sized such that when the outer sleeve is used, the film running rate is substantially 4/3 the rate when the inner sleeve alone is used.

25 Claims, 2 Drawing Sheets

4:3 PERF CONVERSION SPROCKET

BACKGROUND OF THE INVENTION

The present invention relates to a sprocket assembly which, when mounted on a film projector or other film handling device, permits the ready conversion of the device to run either 4-perf or 3-perf film, as the occasion requires.

Conventional 35 mm film projectors and cameras pull down four-perf film. "Four-perf" film signifies that each frame has four perforations along the two side edges of the film. The perforations are all spaced apart the same distance, known as the pitch length. The "pulldown" operation in either production or projection of films involves engaging the perforations on the sides of each frame with a claw gear and bringing the frames, in sequence, into register with the appropriate apertures for exposure or projection. Four-perf pulldown means simply that to place each frame in front of the appropriate aperture at the proper time, the four perforations along the sides of each frame are engaged and pulled down together. Currently, longtime worldwide use and acceptance of four-perf pulldown has led to its being the standard format for both production and projection of films.

Historical accident is largely responsible for the advent and current widespread use of four-perf film. The standard film gauge of 35 mm was first introduced by Thomas Edison in 1891 for use in a peep show viewing apparatus developed by his assistant, W. K. L. Dickson. Edison also chose a four-perf, 4:3 ratio frame format, where the frame width to frame length ratio is 4:3, because it happened to be compatible with this particular peep show viewing apparatus. At that time, Edison gave no thought, apparently, to that format's ever being used in the projection of motion pictures. As it turned out, this 4:3, four-perf frame format was recognized as the world standard by 1907, after the Lumiere brothers of Lyon, France, builders of the first commercially successful projectors, followed Edison's lead by accepting that format for the European film industry.

In early films, the so-called "full aperture" frame format was used. The full aperture format had a 4:3 ratio of frame width to frame length (the length being measured along the longitudinal extent of the film), otherwise known as the 1.33 aspect ratio, and resulted in nearly the entire length of film being exposed or utilized, since there was very little unexposed film between frames. With the addition of sound during the 1920's, the image size on the film was reduced to allow room for the sound track to be printed adjacent to one row of perfs. In order to accommodate the sound track, the image size was reduced in both width and length, maintaining the 4:3 or 1.33 aspect ratio, so that a greater amount of unused or unexposed film was left between frames. The reduced size, 4:3 ratio frame format is known as the "academy aperture."

To achieve a wider projected image, and thus more closely resemble a theatrical stage, the 4:3 frame format was changed to accommodate projection on a flat, wide screen. In North America, the image size was reduced from the academy aperture and conformed into a 5.5:3 ratio, popularly known as the 1.85 aspect ratio. In Europe, the flat, wide screen frame format was conformed into a 1.66 aspect ratio, which again resulted in an image size smaller than that obtained with the academy aperture.

To achieve either the 1.85 or 1.66 wide, flat screen format in a theater from a 35 mm film, two techniques are presently employed: (i) a mask is placed in the projector gate, or (ii) a "hard matte" is used in the camera. In both cases, the 35 mm camera advances the film four perfs at a time, for each frame. The mask in the projector gate is employed when a camera is used for filming which is adapted to produce an image on the film having a 1.33 aspect ratio, since it is necessary to restrict the height of the 1.33 frame when projecting onto a screen requiring a 1.85 or 1.66 frame. The mask in the projector gate cuts off the unnecessary top and bottom portions of the 1.33 image so that it will fit the 1.85 or 1.66 image format. On the other hand, the "hard matte," which is also a type of mask, in the camera is used to record a photographic image which has the correct wide screen ratio. The mask in the camera results in a wide, unexposed portion of film between each frame and the adjacent frames.

With either of the above two techniques for obtaining the correct 1.85 or 1.66 aspect ratio image, the amount of film used is of the order of one-third greater than the combined length of the photographic images and the required spacing between images, assuming, again, that 4-perf pulldown is employed. In other words, about 25% of each film is presently not being used. This excess film results in unnecessary expense for buying, processing, editing, and printing of the film used for motion pictures, as well as extra expense for storage, shipping, handling, add the like.

Another wide-screen film technique known as Cinemascope was introduced in the early 1950's. Cinemascope achieved a 2.35 aspect ratio through the use of anamorphic lenses, which squeezed the image into the 4:3 academy aperture frame in production, and subsequently unsqueezed it in projection onto a wide, curved screen. Normally, a 4-perf pulldown 35 mm camera with a 2:1 anamorphic optical system would be used in filming. This system reduces the horizontal component of the scene which is recorded on the film. The projector uses a complementary 2:1 anamorphic optical system such that the horizontal component of the image is increased to conform the proportions of the projected image to those of the scene filmed. Presently, the flat, wide screen format is more popular and widely used than the anamorphic 2.35 format.

For the last fifteen years or so, there have been proposals in the film industry to convert from 4-perf production, which is now the industry standard, to 3-perf production in order to eliminate the 25% of each film which is wasted, as referred to above. In other words, if the perforation spacing or pitch length were to remain the same, which it must for all practical purposes, a film using 3-perf pulldown, which has only 3 perfs per frame, is precisely 25% shorter than it would be using 4-perf pulldown, which has 4 perfs per frame. One such proposal is found in Lente U.S. Pat. No. 3,865,738, issued Feb. 11, 1975. The Lente patent discloses means for producing 3-perf films for flat, wide screens or anamorphic, curved wide screens. With the recent advent of production equipment that easily converts from 4-perf to 3-perf, and with the introduction of new film stocks that will facilitate 3-perf editing, the remaining stumbling block to industry-wide conversion to 3-perf films is the inability to convert cinema projectors easily and inexpensively to accept 3-perf or 4-perf release prints.

Currently, worldwide standard projection systems use a relatively heavy feed sprocket and hold-back sprocket, a lighter-weight intermittent sprocket between the feed sprocket and hold-back sprocket, and constant-speed sprockets associated with the accompanying sound track. These sprockets are all sized and run at the appropriate speed in order to project 24 frames per second ("fps") with a 60-cycle power supply, or 25 frames per second with a 50-cycle power supply. At a 24 fps projection rate, with 4-perf films using the worldwide standard pitch length, precisely 90 feet of film are run per minute.

If 3-perf films were to be produced and made available to cinema houses, modifications would have to be made to the projectors in order to project those 3-perf films. The object with 3-perf projection would still be to project at a rate of 24 fps, and since the sprocket shafts on the conventional projectors do not change their rates of rotation, changes in sprocket sizes would be necessary in order to effect the proper film running rate.

In order to project 24 fps of 3-perf film, precisely 67.5 feet of film would have to be run per minute. One way to effect the 67.5 feet-per-minute running rate required for 3-perf film projection would be to replace the sprockets used for 4-perf films with sprockets having only 75% of the diameter of the larger 4-perf sprockets, with the pitch length remaining the same. In one conventional projection system for 35 mm, 4-perf films, the 4-perf sprockets have 16 teeth around their circumferential peripheries on each end. Because the teeth on the projector sprockets must always have the same pitch length no matter whether 4-perf or 3-perf film is being projected, the 3-perf sprockets for this conventional system, being sized at 75% of the diameter (and, thus, the circumference as well) of the larger 4-perf sprockets, would have only 12 teeth around their circumferential peripheries at each end. Conversion of projectors involving removal of the 16-tooth sprockets (or any larger sprocket) and replacement with smaller 12-tooth sprockets (or any smaller sprocket), is a time-consuming, relatively expensive process, however, and after conversion to the smaller 3-perf sprockets the projection equipment could not be used to run 4-perf films. Conversion from 4-perf to 3-perf pulldown, and back again, depending on whether the film to be shown is 4-perf or 3-perf, is cumbersome, slow, expensive, and would simply not be feasible with existing equipment. See, e.g., "Study Group on 30 Frame Film Rate," *International Photographer*, December, 1988, at p. 20.

It can be seen that there is presently no incentive for making release prints for theatrical presentation in a 3-perf format; accordingly, release prints will still be made with 4-perf pulldown in order to be compatible with existing movie house projection equipment. This is so whether the production print of the film is in 4-perf or 3-perf format. As a result, the great cost savings which could be realized by making 3-perf release prints from 3-perf production prints, eliminating the 25% waste factor, will be lost as the 3-perf production prints are converted to 4-perf release prints, with their 75% image utilization, in order to be compatible with present movie house projection equipment. The savings which could be realized through making 3-perf release prints are due not only to the lower direct material costs, i.e., the lower cost of the film for the 25% shorter prints, but also to savings in printing or processing, storage, handling, shipping, and the like of such shorter, lighter weight films. Since many more release prints are made than production prints, the savings to be realized from making 3-perf release prints are potentially greater than those to be realized through simply making 3-perf production prints.

Another significant savings with use of 3-perf film is potentially available in conversion of film to video. Video is run at a scanning rate of 30 fields per second, not at the presently used film rate of 24 frames per second. Video which is produced from film must be specially processed to correct for these differences in rate. A desirable alternative to such special processing would appear to be to produce and project films at 30 fps. Production of videos from 30 fps films would not involve such special processing. Such an increase in film production and projection rates would, however, increase the amount of film used in a motion picture by 25%. With 3-perf film, even with an increase in production and projection rates to 30 fps to be compatible with video, film usage would still be less than with 4-perf film running at the standard 24 fps. Three-perf film running at 30 fps uses 84.375 feet of film per minute, compared with 90 feet per minute for 4-perf film running at 24 fps. These same relative film savings of about 6% will accrue whether one is using 3-perf film to produce standard video or High Definition TV. The latter is expected to become increasingly popular.

Thus, it will be appreciated that what is needed is a convenient, fast, simple, and inexpensive system for converting existing 4-perf projectors to make them readily compatible with and adaptable to either 3-perf or 4-perf prints. This will encourage production of 3-perf release prints, since theater operators will be able to show 3-perf in their theaters or 4-perf, as the case may be, without undue inconvenience, expense, or delay, thereby capturing the great cost savings referred to above and positioning the industry to still realize significant cost savings of the order of 6% in the event that a 30 fps film production and projection rate were to be adopted.

SUMMARY OF THE INVENTION

The present invention solves the problems discussed above in connection with prior art film production and projection systems and will enable the film industry to capture the potential vast cost savings referred to previously by providing a device which will allow fast, fairly simple, relatively inexpensive changeovers in existing projection equipment, once modified with a one-time conversion to the smaller (e.g., 12-tooth) sprockets, to accommodate either 4-perf or the proposed new 3-perf pulldown films. The one-time conversion to the 12-tooth, smaller sprockets will enable the projection equipment to run the proposed 3-perf films. The present invention will allow a simple change to be made to those 12-tooth sprockets to permit the same equipment to run 4-perf films.

The present invention includes a sprocket assembly for a film projector or other film handling device which has an outer cylindrical sleeve having a set of sprocket teeth with standard film industry pitch length and conventional shape or profile around its circumference at each end, each set of teeth being designed to engage the film perforations or perfs on either side of the film in order to run the film through the projector or other film handling device. An inner cylindrical sleeve is adapted to fit within the outer sleeve. The inner sleeve also has a set of sprocket teeth around its circumference at each end for engaging the film perforations to run the film, the inner sleeve teeth also having a conventional shape or profile and standard pitch length.

Preferably, the teeth on the inner sleeve mate with a plurality of grooves or splines on the inner surface of the outer sleeve. The result is that both sleeves are rotationally locked together, and rotation of one causes rotation of the other. For added locking effect, the inner sleeve preferably includes a set screw which can be fitted into an opening in the outer sleeve. This locks the outer sleeve to the inner sleeve in a longitudinally axial direction, preventing one sleeve from being removed from the other in such axial direction.

The diameter of the outer sleeve, and, thus, the circumference, is 4/3 that of the diameter and, thus, the circumference, of the inner sleeve, and, because the teeth are spaced apart the same distance as the film perforations, the outer sleeve has 4/3 as many teeth as the inner sleeve. When rotated at the same shaft speed, e.g., when mounted on a shaft in a projector, the outer sleeve/inner sleeve combined assembly will engage 4/3 as much film in a given time period as the inner sleeve alone. The inner sleeve alone, when mounted on a conventional projector and run at conventional shaft speed, will run 67.5 feet of film per minute, corresponding to the 3-perf projection rate. When the outer sleeve is installed on the inner sleeve, the combination of the inner and outer sleeves, with the outer sleeve engaging the film, will run 90 feet of film per minute if shaft speed remains the same, corresponding to the 4-perf projection rate.

The invention will now be described in greater detail with reference to the accompanying drawings.

DESCRIPTION OF THE PREFERRED EMBODIMENTS

Figure 1:
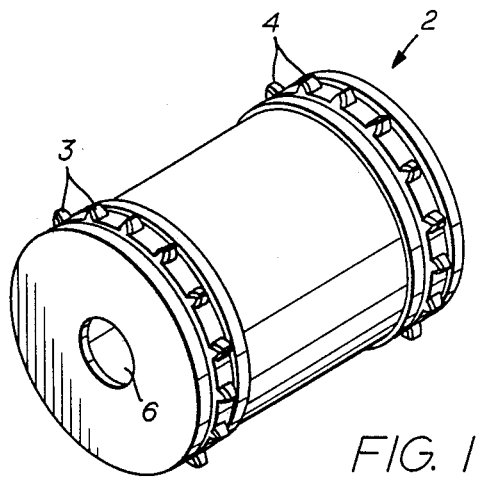
FIG. 1 is an isometric view showing a relatively heavy feed or hold-back sprocket typical of those currently in use.

Referring initially to FIG. 1, there is shown a conventional sprocket 2, which may be either a feed or hold-back sprocket, for example, designed for use in a film projector or other film handling device (for example, a telecine, used in conversion of films to video) to run 4-perf film. Sprocket 2 has a relatively heavy, substantially solid body of metal such as steel or other suitable material and includes two sets of teeth, 3 and 4, respectively, around its circumference at its ends for engaging the perforations at the edges of movie film, for example, 35mm film, as the film is run. The teeth of sets 3, 4 of sprocket 2 are of conventional shape or profile and have a pitch length, or distance between adjacent teeth, which is standard in the film industry. Sprocket 2 also has a central longitudinal axial bore 6 adapted for receiving a rotatable shaft, such as the drive shaft, for example, of the projector.

Figure 2:
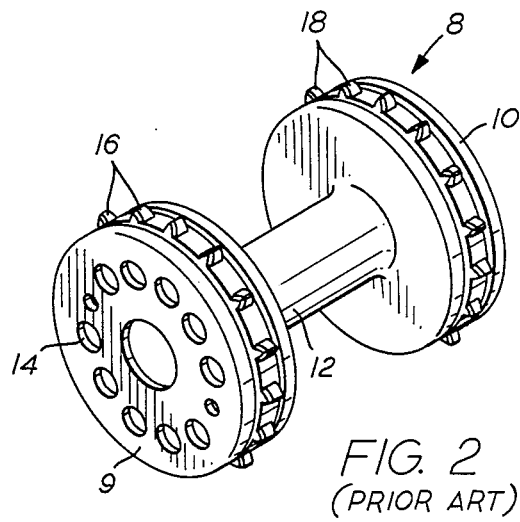
FIG. 2 is an isometric view showing an intermittent sprocket typical of those currently in use.
Figure 3:
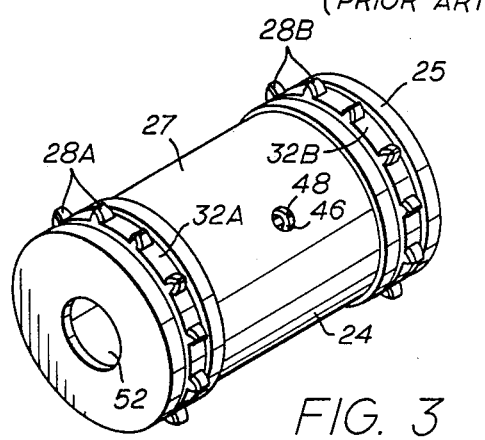
FIG. 3 is an isometric view of one preferred embodiment of the inner sleeve of the sprocket assembly of the present invention.
Figure 4:
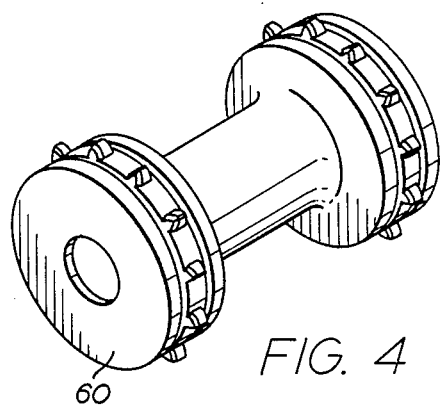
FIG. 4 is an isometric view of an intermittent sprocket suitable for use with the sprocket assembly of the present invention.
Figure 5:
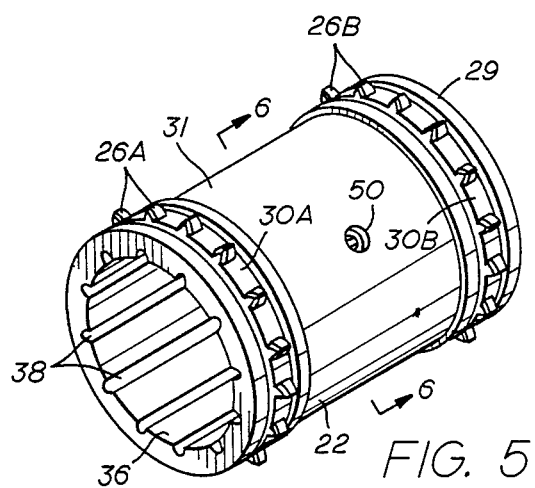
FIG. 5 is an isometric view of one preferred embodiment of the outer sleeve the sprocket assembly of the present invention.

Referring to FIG. 2, there is shown an intermittent sprocket 8 of a conventional type which may be used, for example, in the projector or other film handling device referred to in connection with sprocket 2. Sprocket 8 has two wheel-like bodies 9, 10, joined by axle or shaft 12, all of lightweight material, such as light gauge steel, aluminum, or other suitable material. Sprocket 8 may include a plurality of blind perforations 14 in its end faces. Sprocket 8 also includes two sets of teeth 16, 18 around the circumference of wheel-like bodies 9, 10, respectively, for engaging the perfs of the film to be run through the projector or other film handling device. The circumference of sprocket 8 around teeth 16, 18 is typically the same as that of sprocket 2 around teeth 3, 4, and like sprocket 2, the teeth of sprocket 8 have a conventional shape or profile and standard film industry pitch length. Sprocket 8 is considerably lighter in weight than sprocket 2.

Referring now to FIGS. 3–6, there is shown a preferred embodiment of the sprocket assembly of the present invention, indicated generally at 20. Sprocket assembly 20 includes an outer sleeve 22 (FIG. 5) and an inner sleeve 24 (FIG. 3), each having means for engaging standard movie film perforations, such as 35 mm film perforations, when the film is run through the projector or other film handling device. Such means includes two sets of teeth 26A, 26B, and 28A, 28B, around the circumference of sleeves 22, 24, respectively, at their ends. Such means further includes a pair of collars 30A, 30B on outer sleeve 22, and a pair of collars 32A, 32B on inner sleeve 24, each collar forming a base for one of the sets of teeth 26A, 26B and 28A, 28B. The collars are preferably integral with the bodies of sleeves 22, 24. The teeth of sets 26A, 26B, 28A, 28B are preferably all of conventional shape and preferably have a pitch length equal to the present film industry standard. The diameter of collars 30A, 30B is 4/3 the diameter of collars 32A, 32B. Thus, the circumference of collars 30A, 30B is 4/3 that of collars 32A, 32B. Since the pitch length of the teeth on outer sleeve 22 is the same as that of the teeth on inner sleeve 24, there are 4/3 the number of teeth on outer sleeve 22 as on inner sleeve 24. When outer sleeve 22 is mounted on inner sleeve 24 and the combination is mounted on a projector shaft such that outer sleeve 22 is engaging film perforations during the running of film, it can be seen that at the same rate of shaft rotation, 4/3 as much film is run as when inner sleeve 24 alone is used, i.e., without outer sleeve 22. Outer sleeve 22 is adapted for use with 4-perf film, and inner sleeve 24 for 3-perf film.

The inner sleeve 24 has a relatively heavy, substantially solid body 25 of steel or other suitable material with a reduced O.D. mid-portion 27. Reduced O.D. mid-portion 27 is adapted to be spaced from the film surface as the film travels by on sleeve 24, so that the images on the film will not be damaged by engagement with the surface of the sleeve. Outer sleeve 22 has a relatively heavy body 29 of steel or other suitable material, and it, too, has a reduced O.D. mid-portion 31 to space the sleeve's surface from that of the film as the film is passed along the sleeve.

The teeth in the sets 26A, 26B and 28A, 28B are, as mentioned above, spaced the same distance apart as the perforations on the edges of the film for which sprocket assembly 20 is to be used. For conventional films, that distance will be the standard industry pitch length, as referred to above. It should be understood, however, that other pitch lengths could be used, and the teeth on sleeves 22, 24 would then be spaced according to that other pitch length. Similarly, the longitudinal distance between the sets of teeth 26A and 26B, and the longitudinal distance between the sets of teeth 28A and 28B, is substantially the same as the width of the film between the perforations on the edges of the film. Again, for standard films that distance will be set, but any other distance could be used. The longitudinal extent or length of sleeves 22 and 24 is substantially the same as the width of the film to be run with sprocket assembly 20. Thus, sets of teeth 26A, 26B and 28A, 28B are aligned to engage the film perforations in sequence as pulldown occurs.

Figure 6:
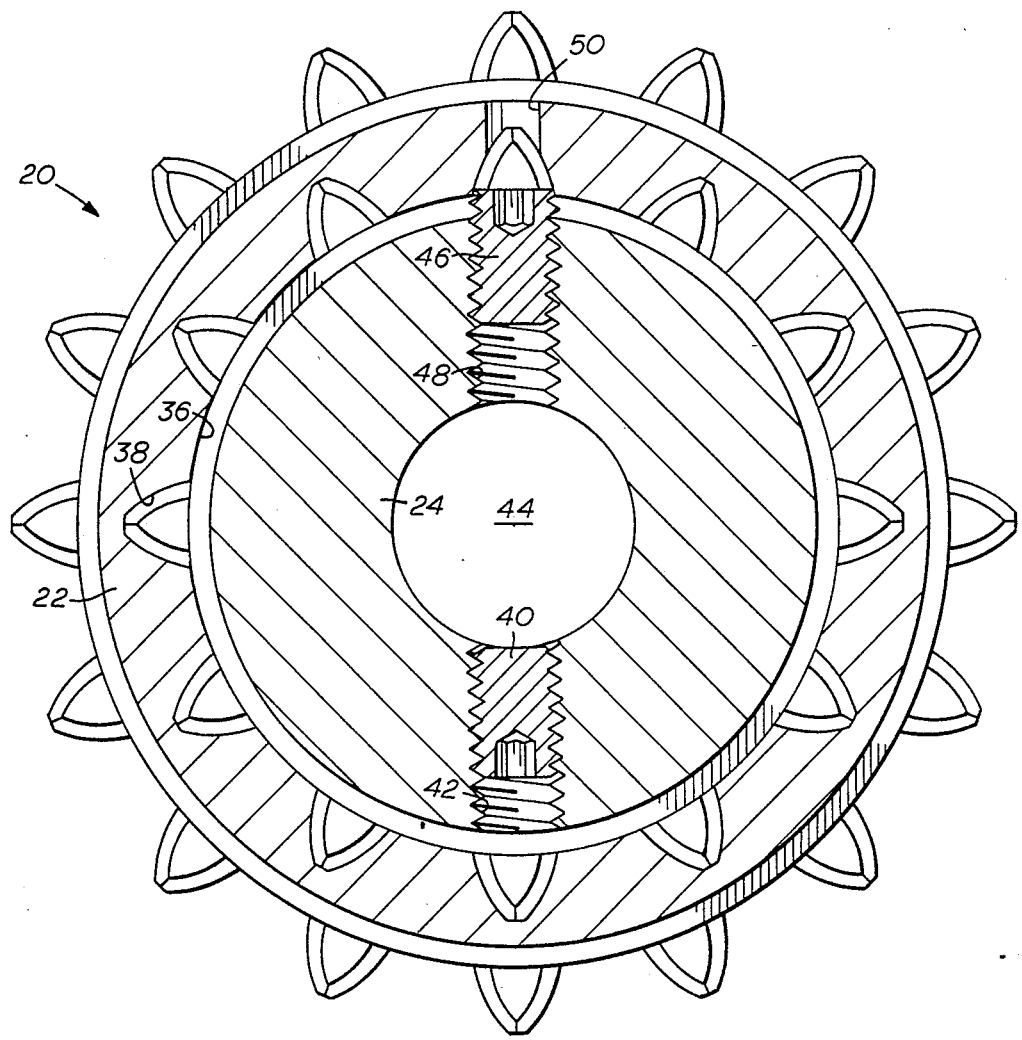
FIG. 6 is an enlarged, vertical cross-sectional view of the sprocket assembly of the present invention, taken along lines 6—6 shown in FIG. 5 and with the inner sleeve of FIG. 3 installed in the outer sleeve of FIG. 5.

Inner sleeve 24 and outer sleeve 22 are designed to be mated to rotate together. As indicated in FIG. 6, inner sleeve 24 is adapted to be telescoped into a bore 36 in outer sleeve 22. A plurality of longitudinally axially extending grooves or splines 38 are circumferentially spaced apart around the inner wall surface of bore 36 of outer sleeve 22. The teeth 28A, 28B are received in splines 38 when inner sleeve 24 is inserted into bore 36 of outer sleeve 22. Rotation of inner sleeve 24 within outer sleeve 22 is prevented by engagement of teeth 28A, 28B with the walls of splines 38.

Grooves or splines 38 extend substantially parallel to the longitudinal axis of outer sleeve 22 along the entire length of sleeve 22. According to one embodiment of the invention, there are the same number of splines 38 as the number of teeth in each set 28A, 28B. There may be fewer splines, as long as the desired antirotational effect is achieved. For example, if splines 38 were wide enough (measured in a circumferential direction) to accommodate two adjacent teeth therewithin, only half as many splines would be required as teeth. For a 12-tooth inner sleeve 24, for example, only six splines would be required. It is believed that the desired antirotational effect could be achieved with as little as one spline. That is, if the bore 36 otherwise had a sufficient I.D. to receive the remaining teeth without interference, a single longitudinally extending keyway could be placed on the I.D. of the bore to accommodate one tooth each from sets 28A, 28B, those teeth being in register with one another. Such a keyway could be sufficient to prevent rotation of inner sleeve 24 within outer sleeve 22. It is preferred, however, to use a plurality of splines 38 spaced about the inner periphery of outer sleeve 22 in order to more evenly distribute the forces acting on the sleeves 22, 24 and their respective teeth. As shown in FIG. 6, in this preferred embodiment each groove 38 is sized to accommodate one pair of opposed teeth, i.e., one tooth from each of the sets of teeth 28A, 28B resides in each groove 38 when inner sleeve 24 is telescoped within outer sleeve 22. A set screw 40 is threaded into a radially or transversely extending bore 42 in inner sleeve 24 and can be tightened against a shaft 44 of a projector or other film handling device for locking inner sleeve 24 to shaft 44 to prevent relative axial or rotational movement of inner sleeve 24 or sprocket assembly 20 with respect to shaft 44, and to permit shaft 44 to rotate as a unit with the inner sleeve or the combined sprocket assembly. The locking of shaft 44 and inner sleeve 24 can be accomplished by other means, for example a spring-loaded ball in one member which mates with a seat or groove in the other. Still other means of locking the inner sleeve on shaft 44 will no doubt be apparent to those skilled in the art. A second set screw 46 is threaded into a second radially or transversely extending bore 48 in inner sleeve 24. Inner sleeve 24 is oriented within outer sleeve 22 so that bore 48 is in register with a radially or transversely extending bore 50 in outer sleeve 22. Set screw 46 is adapted to be backed out from bore 48 and partially into bore 50 in order to lock inner sleeve 24 and outer sleeve 22 together axially, i.e., to prevent the axial separation of sleeves 22, 24. Again, this locking could also be accomplished with other means, for example the spring-loaded ball and seat arrangement referred to above, or any other suitable means.

As noted above, the ratio of the diameters, circumferences, and numbers of teeth for sleeves 22, 24 is 4:3. Thus, in the embodiment shown in FIGS. 3-6, which is designed to run conventional movie film such as 35 mm film, there are 16 teeth on each end of outer sleeve 22 and 12 teeth on each end of inner sleeve 24. Sleeves 22 and 24 can be larger or smaller and can have a greater or lesser number of teeth, provided that the 4:3 ratio is maintained.

Sprocket assembly 20 is designed to be attached to a rotating or rotatable shaft of a projector. A central axial bore 52 through inner sleeve 24 is adapted to be telescoped over the shaft, e.g., a drive shaft, of the projector (not shown) and mated therewith, e.g., through tightening set screw 40 against the shaft, so that sprocket assembly 20 can be rotated with the shaft.

Once the requisite number of inner sleeves 24 have been installed on the projector, it is relatively easy to conform the projector to run either 4-perf or 3-perf film. In order to run 4-perf film, the operator simply slides an outer sleeve 22 over each of the previously-installed inner sleeves 24, and backs out the set screws 46 into bores 50. With each outer sleeve 22 axially and antirotationally locked to each inner sleeve 24, the sprocket assemblies 20 are set to run 4-perf film. In order to run 3-perf film, set screws 46 are threaded further into their bores 48 and out of bores 50, and outer sleeves 22 are removed by pulling them axially off of inner sleeves 24. Thus, it will be appreciated that conversion of a projector incorporating sprocket assemblies 20 of the present invention from either a 3-perf mode to a 4-perf mode or from 4-perf back to 3-perf is relatively easy, and can be done relatively quickly and inexpensively.

It should be noted that a conventional projector has several sprockets which engage the film. It is contemplated that a sprocket assembly 20 will replace all of the sprockets in the projector, including the feed and holdback sprockets and the constant-speed sprockets, but not the lightweight intermittent sprocket 8, shown in FIG. 2. To run =3-perf film, intermittent sprocket 8 is preferably completely removed and replaced with an intermittent sprocket which is 3/4 its diameter, such as intermittent sprocket 60 shown in FIG. 4. The replacement of the lightweight intermittent sprocket 8 with the smaller intermittent sprocket 60 to run 3-perf films, as opposed to using a sleeved sprocket assembly, is preferred for mechanical reasons. Once sprocket 60 is installed, in order to run 4-perf films, it will then be necessary to remove the sprocket 60 and replace it with sprocket 8. It should be understood, however, than an inner lightweight sprocket could be used to run 3-perf films and an outer sleeve similar to sleeve 22 could be provided for installation over the smaller intermittent sprocket in order to run 4-perf films. This would eliminate the need to completely remove and re-install sprockets 8, 60, as the case may be. It should be noted that removal and replacement of the intermittent sprockets 8, 60 is not a difficult task, however, and for the previously-mentioned mechanical reasons, that is the preferred approach.

It should also be understood that although a tooth-to-groove locking mechanism for locking the inner and outer sleeves together is illustrated, the present invention is not limited to any particular form of antirotationally locking together the inner and outer sleeves. Other locking means could be used, so long as a secure, reliable connection is obtained. For example, bore 36 could be milled or drilled out to be substantially the same diameter as the tooth-tip-to-tooth-tip diameter of inner sleeve 24, and a nut and bolt could be placed in aligned bores through outer sleeve 22 and inner sleeve 24 to hold them together. Other variations will no doubt occur to one skilled in the art. It should also be understood that the present invention can be employed in any concentrically disposed dual sprocket system for film production or projection to effect a 4:3 perf conversion.

The foregoing descriptions, terms and expressions should be taken as exemplary only, and not limiting. Many variations and modifications to the invention shown and described in detail are possible. Accordingly, the scope of the invention should be determined only by reference to the claims which follow, and further includes any and all equivalents of the subject matter of the claims.

What is claimed is:

1. A sprocket assembly for converting a film projector or other film handling device having at least one rotatable shaft to make it compatible with either 3-perf or 4-perf film, such films having a predetermined spacing between perfs that is the same for both films, comprising:
    an inner cylindrical sleeve having first means disposed around its circumference at each end for sequentially engaging the perfs when said inner sleeve is rotated;
    mounting means disposed on said inner cylindrical sleeve for nonrotatably mounting said sleeve on the projector shaft;
    an outer cylindrical sleeve insertable over said inner cylindrical sleeve and having second means disposed around its circumference at each end for sequentially engaging the perfs when said outer sleeve is rotated;
    interengageable locking means, disposed on said inner sleeve and said outer sleeve for antirotationally locking the inner sleeve within the outer sleeve;
    the outside diameter of said second means for sequentially engaging the perfs being substantially 4/3 that of the outside diameter of said first means for sequentially engaging the perfs.

2. The sprocket assembly of claim 1 wherein said first and second means for sequentially engaging the perfs each includes two sets of sprocket teeth, the adjacent teeth of each set being circumferentially spaced apart the same distance as the spacing of the film perfs.

3. The sprocket assembly of claim 2 wherein the teeth on the inner sleeve antirotationally engage the inner surface of the outer sleeve.

4. The sprocket assembly of claim 3 wherein the inner surface of the outer sleeve includes a plurality of longitudinally axially extending grooves spaced substantially the same distance apart as each of the teeth on the inner sleeve, each groove being adapted to receive one opposed pair of teeth of said two sets on said inner sleeve when said inner sleeve is inserted into said outer sleeve.

5. The sprocket assembly of claim 3 wherein the inner surface of the outer sleeve includes at least one longitudinally axially extending groove for receiving therewithin at least one opposed pair of teeth on said inner sleeve when said inner sleeve is inserted into said outer sleeve.

6. The sprocket assembly of claim 2 wherein the inner and outer sleeves are of substantially the same length and the sets of teeth on each sleeve are spaced apart the same distance longitudinally.

7. The sprocket assembly of claim 2 wherein the inner and outer sleeves each include a raised collar around their respective ends, each collar forming a base for the set of teeth at the respective ends of the sleeves.

8. The sprocket assembly of claim 1 wherein said inner sleeve is adapted to lockingly engage a drive shaft of the projector such that axial or rotational movement of said inner sleeve with respect to said drive shaft is prevented.

9. The sprocket assembly of claim 1 wherein said mounting means includes a set screw disposed in a radially extending threaded bore in said inner sleeve for engaging the projector shaft.

10. The sprocket assembly of claim 6 wherein said inner sleeve includes a second set screw disposed in a second radially extending threaded bore in said inner sleeve and engageable with a radially extending bore in said outer sleeve for preventing the axial separation of said sleeves.

11. A sprocket assembly for a film projector or other film handling device to make it compatible with either 3-perf or 4-perf movie film, the film having predetermined spacing between perfs along its side edges, comprising:
    an outer cylindrical sleeve having a length which is substantially the same as the width of the film and a plurality of teeth around each of its ends which are circumferentially spaced apart the same distance as the predetermined spacing between the film perfs, said teeth being adapted for sequentially engaging the film perfs during pulldown;
    an inner cylindrical sleeve having a length which is substantially the same as that of said outer sleeve and a plurality of teeth around each of its ends which are circumferentially spaced apart the same distance as the teeth on said outer sleeve, said teeth on said inner sleeve being adapted for sequentially engaging the film perfs during pulldown;
    said inner sleeve having means for nonrotatably mounting said inner sleeve on a rotatable shaft of the projector;
    said outer sleeve being telescopingly slidable over said inner sleeve and antirotationally lockable with respect thereto so that both sleeves rotate together;
    said sleeves being sized such that at the same rate of rotation of said rotatable projector shaft, said outer sleeve, when telescoped over said inner sleeve and said inner sleeve is mounted on said shaft, engages 4/3 the length of film as the inner sleeve when used alone, mounted on said projector shaft without said outer sleeve disposed thereon.

12. The sprocket assembly of claim 11 wherein the teeth of the inner sleeve matingly engage a plurality of longitudinal grooves spaced on the inner surface of the outer sleeve.

13. The sprocket assembly of claim 11 wherein said means for mounting the inner sleeve on the rotatable shaft includes a set screw engageable with the shaft.

14. The sprocket assembly of claim 11 wherein the inner sleeve further includes a second set screw engageable with the outer sleeve for locking the sleeves together axially.

15. The sprocket assembly of claim 11 wherein the inner and outer sleeves each include a raised collar at each of their respective ends, the collars each forming a base for the respective teeth.

16. The sprocket assembly of claim 11 wherein the inner sleeve has 12 teeth and the outer sleeve has 16 teeth, said teeth having a pitch length equal to the film industry standard pitch length.

17. A sprocket assembly for converting a film projector or other film handling device to make it compatible with either 3-perf or 4-perf movie film, comprising:
an outer cylindrical sleeve having a set of sprocket teeth at either end which are spaced at the same interval as the perforations on the 4-perf movie film, said teeth being adapted for engaging the film perforations during pulldown;
an inner cylindrical sleeve having a set of sprocket teeth at either end which are spaced at the same interval as the perforations on the 3-perf movie film, said teeth being adapted for engaging the film perforations during pulldown;
said inner sleeve being antirotationally insertable within said outer sleeve;
the number of teeth on the outer sleeve being 4/3 the number of teeth on the inner sleeve.

18. The sprocket assembly of claim 17 wherein the inner sleeve has 12 teeth and the outer sleeve has 16 teeth.

19. The sprocket assembly of claim 17 wherein at least one pair of opposed teeth of the inner sleeve matingly engage at least one longitudinally extending groove on the inner surface of the outer sleeve.

20. The sprocket assembly of claim 17 wherein the inner sleeve further includes means for locking it to a drive shaft of the film projector.

21. The sprocket assembly of claim 17 wherein the inner sleeve further includes means engageable with the outer sleeve for axially locking the inner sleeve to the outer sleeve.

22. The sprocket assembly of claim 17 wherein the inner and outer sleeves each include a raised collar at their respective ends, the collars forming a base for the teeth.

23. The sprocket assembly of claim 17 wherein the length of both the inner and outer sleeves is substantially the width of 35 mm film.

24. The sprocket assembly of claim 17 wherein the spacing of the perforations on the 3-perf film is the same as the spacing of the perforations on the 4-perf film, such spacing being that of the film industry standard spacing.

25. The sprocket assembly of claim 24 wherein the 3-perf film and the 4-perf film is 35 mm film.

* * * * *